United States Patent
Periasamy et al.

(10) Patent No.: US 10,301,976 B2
(45) Date of Patent: May 28, 2019

(54) THREE-WAY VALVE

(71) Applicant: Robert Bosch GmbH, Stuttgart (DE)

(72) Inventors: Ganesan Vengianan Periasamy, Stuttgart-Feuerbach (DE); Sophie-Charlotte Deger-Panthene, Stuttgart (DE); Steffen Buhl, Sachsenheim-Spielberg (DE); Stephan Wehr, Heiligenstad (DE)

(73) Assignee: Robert Bosch GmbH, Stuttgart (DE)

( * ) Notice: Subject to any disclaimer, the term of this patent is extended or adjusted under 35 U.S.C. 154(b) by 113 days.

(21) Appl. No.: 15/483,960

(22) Filed: Apr. 10, 2017

(65) Prior Publication Data
US 2017/0292410 A1 Oct. 12, 2017

(30) Foreign Application Priority Data
Apr. 12, 2016 (DE) .................. 10 2016 206 092

(51) Int. Cl.
| | |
|---|---|
| *F01K 13/00* | (2006.01) |
| *F16K 47/08* | (2006.01) |
| *F01K 23/06* | (2006.01) |
| *F16K 11/07* | (2006.01) |

(52) U.S. Cl.
CPC .......... *F01K 13/006* (2013.01); *F01K 23/065* (2013.01); *F16K 11/07* (2013.01); *F16K 47/08* (2013.01)

(58) Field of Classification Search
CPC ...... F01K 13/006; F01K 23/065; F16K 11/07; F16K 47/08
USPC .......................... 60/614, 616, 618; 137/118.1
See application file for complete search history.

(56) References Cited

U.S. PATENT DOCUMENTS

| | | | | | |
|---|---|---|---|---|---|
| 2,974,637 | A | * | 3/1961 | Holmes | F16P 3/22 137/596.14 |
| 3,779,266 | A | * | 12/1973 | Fruth | G21C 15/18 137/110 |
| 4,744,542 | A | * | 5/1988 | Heusser | F15B 13/02 251/30.01 |
| 5,117,647 | A | * | 6/1992 | Valbjorn | F25B 41/062 251/30.05 |
| 2002/0074042 | A1 | * | 6/2002 | Olivas | F16K 17/30 137/493.9 |
| 2005/0279409 | A1 | * | 12/2005 | Thoms | F15B 13/024 137/493.6 |

(Continued)

FOREIGN PATENT DOCUMENTS

DE 102014224979 6/2016

*Primary Examiner* — Hoang M Nguyen
(74) *Attorney, Agent, or Firm* — Michael Best & Friedrich LLP

(57) ABSTRACT

Three-way valve with a valve housing and a closing body arranged in a longitudinally movable manner in the valve housing. An inlet channel, a first outlet channel and a second outlet channel are formed in the valve housing. The closing body interacts by longitudinal movement with a first valve seat formed in the valve housing and thereby opens and closes a first hydraulic connection between the inlet channel and the first outlet channel. Furthermore, the closing body interacts by longitudinal movement with a second valve seat formed in the valve housing and thereby opens and closes a second hydraulic connection between the inlet channel and the second outlet channel. A throttle is formed in the second hydraulic connection.

10 Claims, 6 Drawing Sheets

(56) References Cited

U.S. PATENT DOCUMENTS

2016/0201612 A1* 7/2016 Pursifull .............. F02M 25/089
                                                        123/520

* cited by examiner

THREE-WAY VALVE

BACKGROUND OF THE INVENTION

The invention relates to a three-way valve, such as a three-way valve used in a waste-heat recovery system of an internal combustion engine.

Diverse embodiments of three-way valves are known from the prior art.

A known three-way valve comprises a valve housing and a closing body arranged in a longitudinally movable manner in the valve housing. An inlet channel, a first outlet channel and a second outlet channel are arranged in the valve housing. The closing body interacts by means of its longitudinal movement with a first valve seat formed on the valve housing and thereby opens and opens and closes a first hydraulic connection to the first outlet channel. Furthermore, the closing body interacts with a second valve seat formed on the valve housing and thereby opens and closes a second hydraulic connection to the second outlet channel. A three-way valve of this type is known, for example, from the application DE 10 2014 224979 A1, which does not constitute a prior publication.

When the opening of the first hydraulic connection is switched over to the opening of the second hydraulic connection, a drop in the pressure of the inlet channel may occur in the case of the known three-way valve.

SUMMARY OF THE INVENTION

By contrast, the three-way valve according to the invention has the advantage that no substantial sudden changes in pressure occur in the inlet channel when the valve position is switched over. The closing bodies and the valve seats therefore wear less, as a result of which the service life of the entire three-way valve is increased.

For this purpose, the three-way valve has a valve housing and a closing body arranged in a longitudinally movable manner in the valve housing. An inlet channel, a first outlet channel and a second outlet channel are formed in the valve housing. The closing body interacts by means of its longitudinal movement with a first valve seat formed in the valve housing and thereby opens and closes a first hydraulic connection between the inlet channel and the first outlet channel. Furthermore, the closing body interacts by means of its longitudinal movement with a second valve seat formed in the valve housing and thereby opens and closes a second hydraulic connection between the inlet channel and the second outlet channel. A throttle is formed in the second hydraulic connection.

The throttle is coordinated with the following consumer downstream of the first and second outlet channel. The first outlet channel has a consumer which has a comparatively high first decrease of pressure. By contrast, the second outlet channel has a consumer which has a comparatively low second decrease of pressure. For this purpose, the throttle is arranged in the second hydraulic connection, and therefore the throttle and the second decrease of pressure correspond in total to the first decrease of pressure.

As a result, there are no significant sudden changes in pressure within the three-way valve when a switch is made from the first hydraulic connection to the second hydraulic connection. Wear and malfunctions of the three-way valve are therefore minimized.

In an advantageous embodiment, the throttle comprises a labyrinth seal. Swirling thereby occurs in the line of flow as the latter flows through the labyrinth seal, and therefore a corresponding loss of pressure arises. The labyrinth seal is simple to manufacture and to mount, and therefore the entire three-way valve can be constructed in a favorable manner.

In an alternative advantageous embodiment, the throttle comprises a worm throttle. The throttle can thus be arranged in an annular or worm-shaped manner around the second hydraulic connection. This is particularly of advantage if a radial construction space but no axial construction space is present.

In an advantageous development, the worm throttle comprises a worm housing with ribs arranged therein and with an outer wall. The throttle is preferably formed between the ribs and the outer wall or the ribs and the valve housing. The flow path through the throttle therefore winds around the ribs. The worm housing including ribs and outer wall can therefore be realized as a cost-effective cast part. Worm housing and valve housing are particularly preferably formed as a single piece.

In a further alternative and advantageous embodiment, the throttle comprises a throttle box. The throttle box can be attached and/or retrofitted in a valve housing in a comparatively simple manner. Accordingly, different throttlings can be realized cost-effectively by means of different throttle boxes depending on the intended use.

In an advantageous development, the throttle box has a first ribbed cylinder and a second ribbed cylinder. The two ribbed cylinders each have in turn a cylinder part wall and ribs arranged thereon. As a result, the flow path as it flows through the throttle can advantageously run between the cylinder part walls and ribs, for example in a winding form.

The two ribbed cylinders advantageously intermesh, and therefore the throttle is formed between the cylinder part wall of the one ribbed cylinder and the ribs of the other ribbed cylinder in each case. For this purpose, the ribs are preferably arranged in parallel, to be precise in an alternating manner of the one ribbed cylinder and of the other ribbed cylinder. The flow path therefore leads around a rib of the first ribbed cylinder, subsequently around a rib of the second ribbed cylinder, subsequently around the next rib of the first ribbed cylinder, etc.

In a further alternative and advantageous embodiment, the throttle comprises a solid cascade, wherein the solid cascade has cascade ribs and throttle bores formed therein. The actual throttle therefore runs through the throttle bores, which can be manufactured with very exacting tolerances. The solid cascade is preferably realized here as a cost-effective cast part.

In an advantageous development, an outer circumference of the solid cascade has a substantially conical shape. The solid cascade can thereby be positioned very precisely in the valve housing. Furthermore, the solid cascade can thus be arranged with a very high prestressing force.

In a further alternative and advantageous embodiment, the throttle comprises a sheet-metal cascade, wherein the sheet-metal cascade has cascade ribs and throttle bores formed therein. The actual throttle therefore runs through the throttle bores, which can be manufactured with very exacting tolerances. The sheet-metal cascade is preferably constructed here from cost-effective individual metal sheets, i.e. the cascade ribs. In a development, the sheet-metal cascade may also be of conical design on its outer circumference.

The cascade ribs are preferably clamped in the valve housing by a flange. The cascade ribs can thereby be simply arranged one above another or next to one another and subsequently secured.

In advantageous embodiments of the invention, the throttle is designed over its length as a diffuser. The flow cross section of the relevant throttle points therefore extends, for example in cascade form, along the throttle. This results in a highly advantageous flow geometry. The throttling can also be realized in a highly precise and robust manner since only the smallest flow cross section of the throttle has to have exacting manufacturing tolerances.

In an advantageous embodiment, the three-way valve according to the invention is arranged in a waste-heat recovery system of an internal combustion engine. The waste-heat recovery system comprises a circuit conducting a working medium, wherein the circuit comprises a pump, an evaporator, a bypass valve, an expansion machine and a condenser in the direction of flow of the working medium. A bypass line is arranged parallel to the expansion machine, wherein the bypass valve controls the mass flow of the working medium to the expansion machine and to the bypass line. The bypass valve is the three-way valve according to the invention. As a result, the mass flow of the working medium can be divided as desired between the expansion machine and the bypass line without this resulting in pressure fluctuations in the pump or in the evaporator. The service life of the entire waste-heat recovery system, especially of the bypass valve, the evaporator and the pump, is thereby increased.

In order for the waste-heat recovery system to be highly efficient, the working medium has to be conveyed from the evaporator to the expansion machine without significant pressure losses. The expansion machine is therefore preferably connected to the first outlet channel.

In an advantageous development, the second hydraulic connection is formed in the bypass line, or the second outlet channel is connected to the bypass line. As a result, the throttle—as a hydraulic part of the bypass line—can preferably be dimensioned in such a manner that the second decrease of pressure, i.e. the decrease of pressure at the throttle, corresponds, when the second hydraulic connection is open, to the first decrease of pressure at the expansion machine when the first hydraulic connection is open.

DETAILED DESCRIPTION

Figure 1:
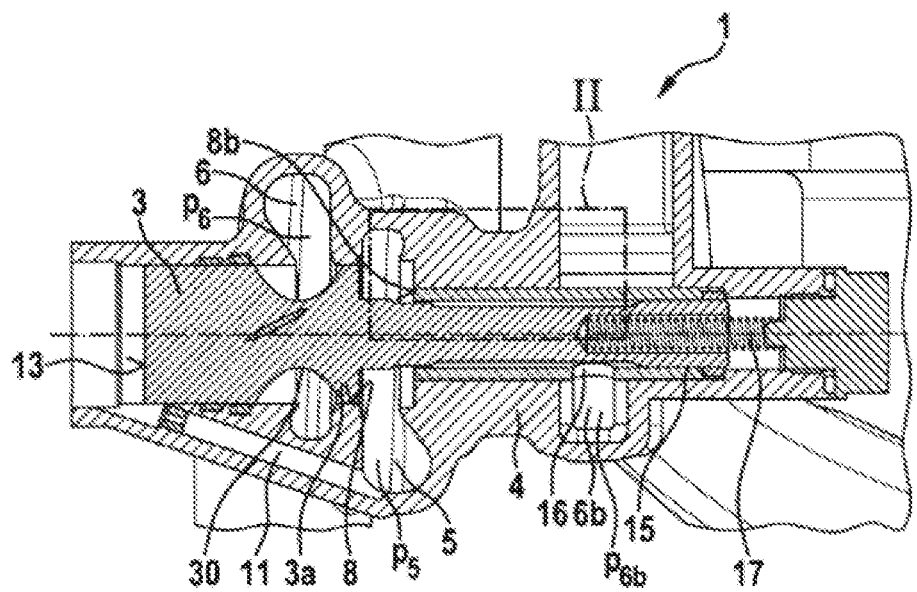
FIG. 1 shows a longitudinal section of a three-way valve, wherein only the important regions are illustrated.

FIG. 1 shows a longitudinal section of a three-way valve 1, wherein only the important regions are illustrated.

The three-way valve 1 has a valve housing 4 in which a closing body 3 is arranged in a longitudinally movable manner. An inlet channel 5, a first outlet channel 6 and a second outlet channel 6b are formed in the valve housing 4. Furthermore, a first valve seat 8 and a second valve seat 8b are formed in the valve housing 4. The closing body 3 surrounds the closing cylinder 3a which interacts both with the first valve seat 8 and with the second valve seat 8b.

The closing cylinder 3a interacts with the first valve seat 8 for opening and closing a first hydraulic connection from the inlet channel 5 to the first outlet channel 6. And the closing cylinder 3a furthermore interacts with the second valve seat 8b for opening and closing a second hydraulic connection from the inlet channel 5 to the second outlet channel 6b. The two valve seats 8, 8b are arranged cylindrically here. As viewed in the axial direction of the closing body 3, the first valve seat 8 is arranged on the one side adjacent to the inlet channel 5 and the second valve seat 8b is arranged on the other side.

In the embodiment of FIG. 1, the first valve seat 8 is designed as an annular slide seat and the second valve seat 8b is designed as an end surface of a valve tube 15 pressed into the valve housing 4, i.e. as a flat seat. Furthermore, radial bores 16 are also formed in the valve tube 15 in order to ensure a flow of the fluid from the inlet channel 5 through the second valve seat 8b to the second outlet channel 6b when the second hydraulic connection is open.

A circumferential groove 30 which constitutes a reduction in the diameter of the closing body 3 is formed on the closing body 3 adjacent to the closing cylinder 3a. If the closing cylinder 3a opens up the first valve seat 8, the circumferential groove 30 is arranged lying radially opposite the first valve seat 8. The hydraulic connection from the inlet channel 5 to the first outlet channel 6 then runs via the circumferential groove 30.

The three-way valve 1 furthermore comprises a compression spring 17 and a connecting bore 11. The compression spring 17 is arranged within the valve housing 4 in such a manner that it endeavors to close the first hydraulic connection and to open the second hydraulic connection; the compression spring 17 therefore presses the closing body 3 into a position as shown in FIG. 1. The connecting bore 11 is formed in the valve housing 4 in such a manner that it hydraulically connects an end surface 13 of the closing body 3, which end surface is formed at that end of the closing body 3 which lies opposite the compression spring 17, to the inlet channel 5; the end surface 13 is therefore acted upon with the fluid pressure of the inlet channel 5 and loads the closing body 3 in the opposite direction to the spring force of the compression spring 17.

The valve drive of the three-way valve 1 which acts on the closing body 3 is not illustrated. However, any valve drive, for example a pneumatic, hydraulic, electromagnetic or piezo-electric valve drive, can be used. The modes of action of the fluid pressure on the end surface 13 and the compression spring 17 are designed in such a manner that, without a valve drive, at low pressures in the inlet channel 5 the first hydraulic connection is closed and the second hydraulic connection is open and, at greater pressures, the first hydraulic connection is open and the second hydraulic connection is closed. These are the two preferred positions of the three-way valve depending on the pressure of the inlet channel 5. The outlay on energy for the valve drive is thereby reduced.

During the operation of the three-way valve 1, the inlet channel 5 is acted upon with an inlet pressure $p_5$, the first outlet channel 6 with a first outlet pressure $p_6$ and the second outlet channel 6b with a second outlet pressure $p_{6b}$. The three pressures $p_5$, $p_6$ and $p_{6b}$ are dependent here on the position of the three-way valve 1, a conveying device upstream of the inlet channel 5 and the respective consumers downstream of the first outlet channel 6 and of the second outlet channel 6b.

Figure 2:
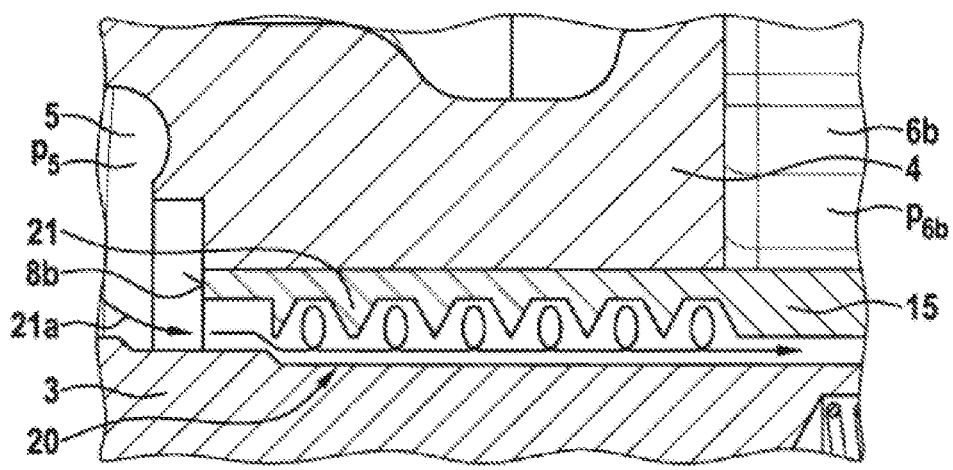
FIG. 2 shows the detail II from FIG. 1 in an exemplary embodiment of the three-way valve according to the invention.

FIG. 2 shows the detail II in FIG. 1. According to the invention, between the valve tube 15 and the closing body 3, a throttle 20 is formed in the second hydraulic connection from the inlet channel 5 to the second outlet channel 6b. As a result, the three pressures $p_5$, $p_6$ and $p_{6b}$ are substantially independent of the position of the three-way valve 1. For this purpose, the throttle 20 is constructed in such a manner that, at the essential operating points, it compensates for the pressure difference between the consumers at the first outlet channel 6 and at the second outlet channel 6b.

That is to say, the consumer downstream of the first outlet channel 6 reduces the inlet pressure $p_5$ (in this case $p_5=p_6$) to the same extent as the throttle 20 and the second consumer. If the second consumer is, for example, only a bypass line, the first consumer (for example an expansion machine) reduces the pressure from the first outlet pressure $p_6$ ($=p_5$) to approx. the second outlet pressure $p_{6b}$.

In the embodiment of FIG. 2, the throttle 20 is designed as a labyrinth seal 21 on the valve tube 15. As a result, when the second valve seat 8b is open, a flow passes through the second hydraulic connection with swirling, as illustrated by the flow line 21a. Said swirling leads to a pressure reduction from $p_5$ to $p_{6b}$ over the length of the labyrinth seal 21.

Figure 3:
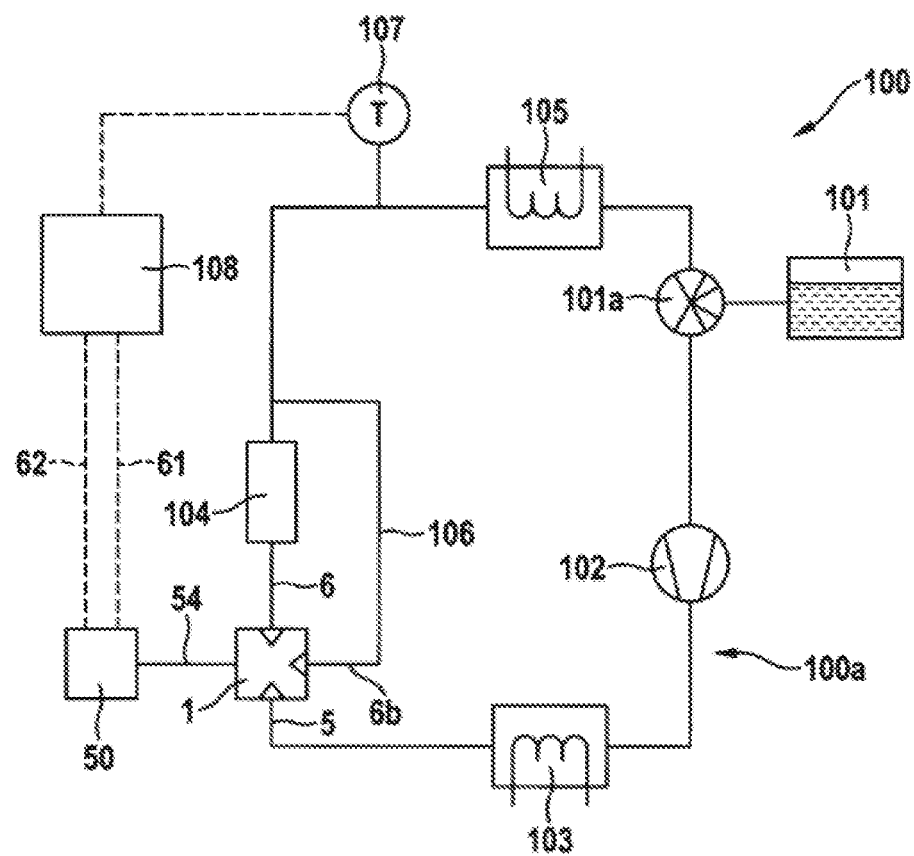
FIG. 3 shows schematically the three-way valve according to the invention within a waste-heat recovery system.

FIG. 3 shows the three-way valve 1 according to the invention arranged in a waste-heat recovery system 100. The waste-heat recovery system 100 of an internal combustion engine (not illustrated) has a circuit 100a which conducts a working medium and comprises a pump 102, an evaporator 103, an expansion machine 104 and a condenser 105 in the direction of flow of the working medium. If required, the working medium can be fed into the circuit 100a from a collecting vessel 101 via a branch line and a valve arrangement 101a. The collecting vessel 101 may alternatively also be connected here into the circuit 100a.

The evaporator 103 is connected to an exhaust line of the internal combustion engine, that is to say utilizes the heat energy of the exhaust gas of the internal combustion engine.

According to the invention, the three-way valve 1 is used as a bypass valve for the expansion machine 104. For this purpose, a bypass line 106 is arranged parallel to the expansion machine 104. Depending on the operating state of the internal combustion engine and variables resulting therefrom, for example temperatures of the working medium, the working medium is supplied to the expansion machine 104 or is guided past the expansion machine 104 by the bypass line 106. For example, a temperature sensor 107 is arranged upstream of the condenser 105. The temperature sensor 107 determines the temperature of the working medium upstream of the condenser 105 and transmits a corresponding signal to a control device 108. The control device 108 activates the control unit 50 via the two electric connections 61, 62 depending on various data, for example the temperature of the working medium upstream of the condenser 105.

The control unit 50 is connected to the three-way valve 1 via the connecting line 54. The three-way valve 1 is switched in such a manner that the working medium is conducted either through the expansion machine 104 or through the bypass line 106. The mass flow of the working medium can also be divided up such that one part of the working medium is supplied to the expansion machine 104 and a further part to the bypass line 106.

The inlet channel 5 of the three-way valve 1 is connected to the evaporator 103 or to the pump 102 such that a relatively high pressure, for example 30 bar, prevails at said inlet channel during operation. The expansion machine 104 expands the pressurized fluid, with mechanical energy being output, and therefore a low pressure, for example 1 bar, prevails downstream of the expansion machine 104. In order to configure the three-way valve 1 to be efficient in terms of energy, the normal-operation decrease of pressure from the evaporator 103 to the expansion machine 104, i.e. through the first hydraulic connection of the three-way valve 1, has to be virtually zero. The three-way valve 1 must not throttle the first hydraulic connection from the inlet channel 5 to the first outlet channel 6.

If, however, the first hydraulic connection is closed and the second hydraulic connection open, the inlet channel 5 is connected via the second outlet channel 6b to the bypass line 106 which has the comparatively low pressure of the condenser 105, for example 1 bar. If the pump 102 continues to convey working medium to the bypass valve 1, a similar (second) decrease of pressure should take place via the second hydraulic connection as via the expansion machine 104 (first decrease of pressure), i.e., for example, from 30 bar to 1 bar. Said second decrease of pressure is produced by means of the throttle 20 according to the invention of the three-way valve 1.

FIG. 2 shows a possible variant embodiment of the throttle 20 as a labyrinth seal 21. Further possible variant embodiments of the throttle 20 are described below.

Figure 4:
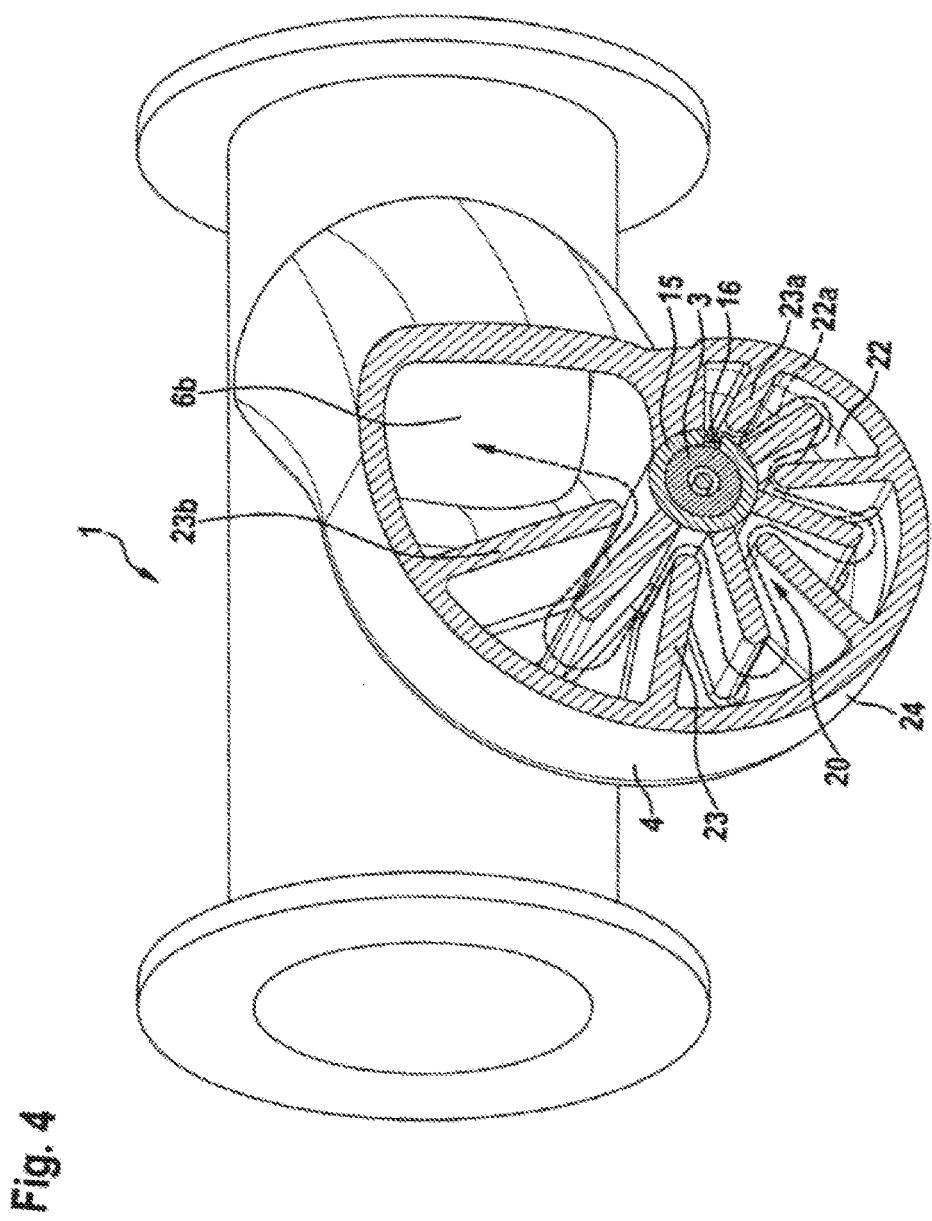
FIG. 4 shows a further exemplary embodiment of a three-way valve in longitudinal section, wherein only the important regions are illustrated.

FIG. 4 shows a further three-way valve 1 according to the invention with the throttle 20, wherein the throttle 20 is embodied as a worm throttle. For this purpose, the valve housing 4 comprises a worm housing 22 which is arranged in a manner radially surrounding the valve tube 15. Alternatively, valve tube 15 and worm housing 22 can also be formed as a single part.

The worm housing 22 has radially running ribs 23 and an outer wall 24. The ribs 23 are star-shaped and are adjacent in an alternating manner to the valve tube 15 and the outer wall 24. This results in a flow path 22a which, coming from the bore 16, leads in a winding manner around the ribs 23 and opens into the second outlet channel 6b.

The ribs 23 have increasing lengths from a first rib 23a which is adjacent to the bore 16 up to a final rib 23b which is adjacent to the second outlet channel 6b. That is to say, the distance of the outer wall 23 from the valve tube 15 increases over the circumference of the outer wall 23 toward the second outlet channel 6b.

The actual throttling of the fluid as the latter passes through the worm throttle can take place between two adjacent ribs 23 and between the ribs 23 and the valve tube 15 or between the ribs 23 and the outer wall 24.

Figure 5:
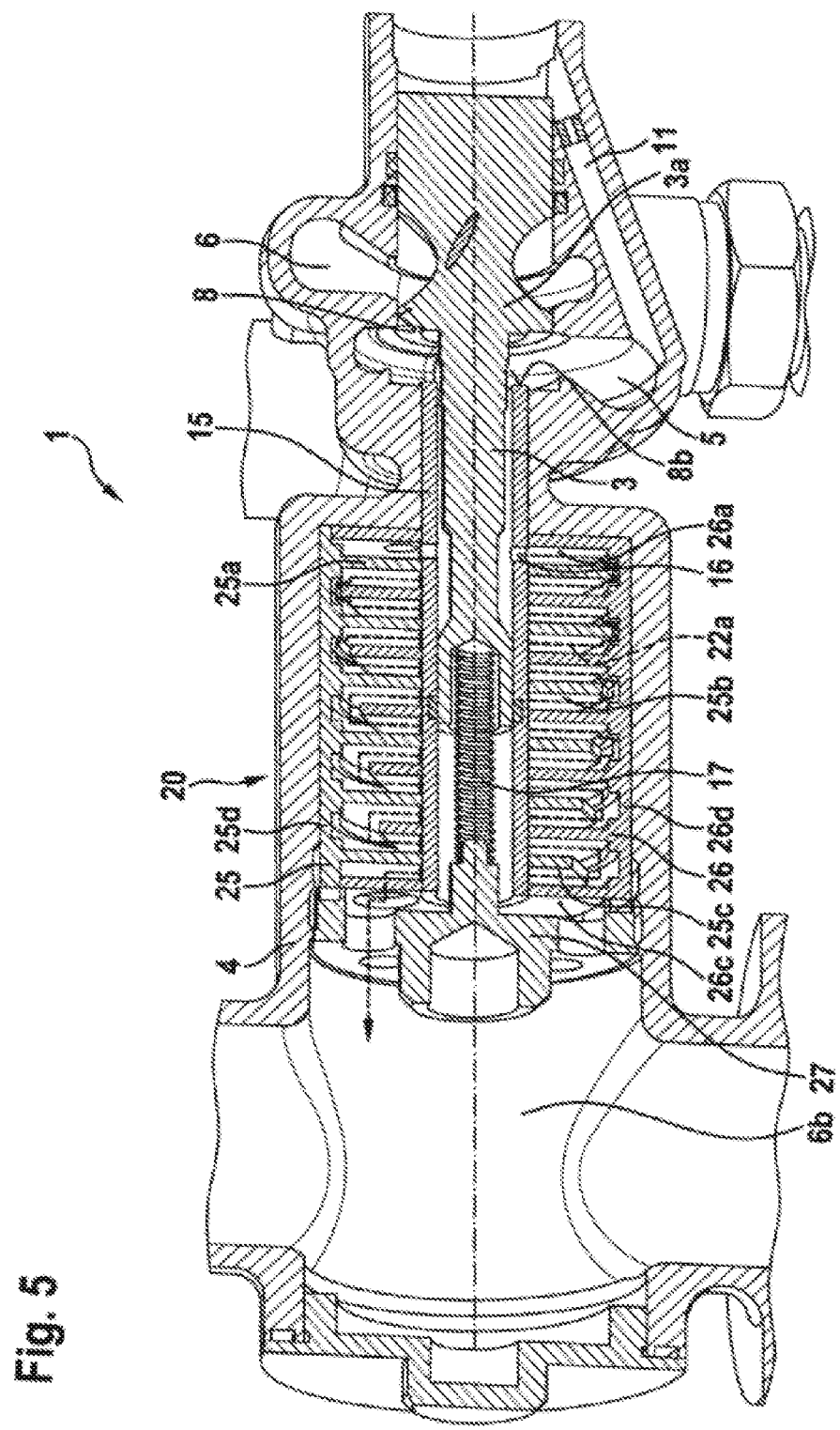
FIG. 5 shows yet another exemplary embodiment of the three-way valve in longitudinal section, wherein only the important regions are illustrated.

FIG. 5 shows a further three-way valve 1 according to the invention with the throttle 20, wherein the throttle 20 is designed as a throttle box. The throttle box comprises a first ribbed cylinder 25 and a second ribbed cylinder 26, wherein the two ribbed cylinders 25, 26 intermesh. The ribbed cylinders 25, 26 each have a number of substantially circular-ring-shaped ribs 25b, 26b which are arranged in a manner surrounding the valve tube 15 radially over the entire circumference.

The ribbed cylinders 25, 26 furthermore each have a cylinder part wall 25d, 26d which can be seen as a housing holding together the respective ribs 25b, 26b. However, the two cylinder part walls 25d, 26d are not encircling in each case, but rather run only over 360° in total, and therefore they can be plugged one inside the other. The two cylinder part walls 25d, 26d preferably run here over 180° in each case. In the mounted state, the two ribbed cylinders 25, 26 are arranged one inside the other and are secured in the valve housing 4 by a flange 27.

The actual throttle points of the throttle 20, which is embodied as a throttle box, from FIG. 5 thus run between the ribs of the one ribbed cylinder and the cylinder part wall of the other ribbed cylinder. There are therefore a plurality of throttle points:

Between the ribs 25b of the first ribbed cylinder 25 and the second cylinder part wall 26d of the second ribbed cylinder 26.

Between the ribs 26b of the second ribbed cylinder 26 and the first cylinder part wall 25d of the first ribbed cylinder 25.

The arrangement and configuration of the ribs 25b, 26b results in a flow path 22a of the fluid flowing through the throttle 20, which flow path runs in a similar manner to the flow path of the exemplary embodiment from FIG. 4, namely in a winding manner around the ribs 25b, 26b. Analogously to the embodiment of FIG. 4, the flow cross section between the ribs 25b, 26b and the adjacent cylinder part wall 25d, 26d becomes greater here in the direction of flow of the fluid. That is to say, a first rib 25a, 26a of the two ribbed cylinders 25, 26, which rib is in each case adjacent to the bore 16, is of larger design than a final rib 25c, 26c of the two ribbed cylinders 25, 26, which rib is in each case adjacent to the second outlet channel 6b.

Figure 6:
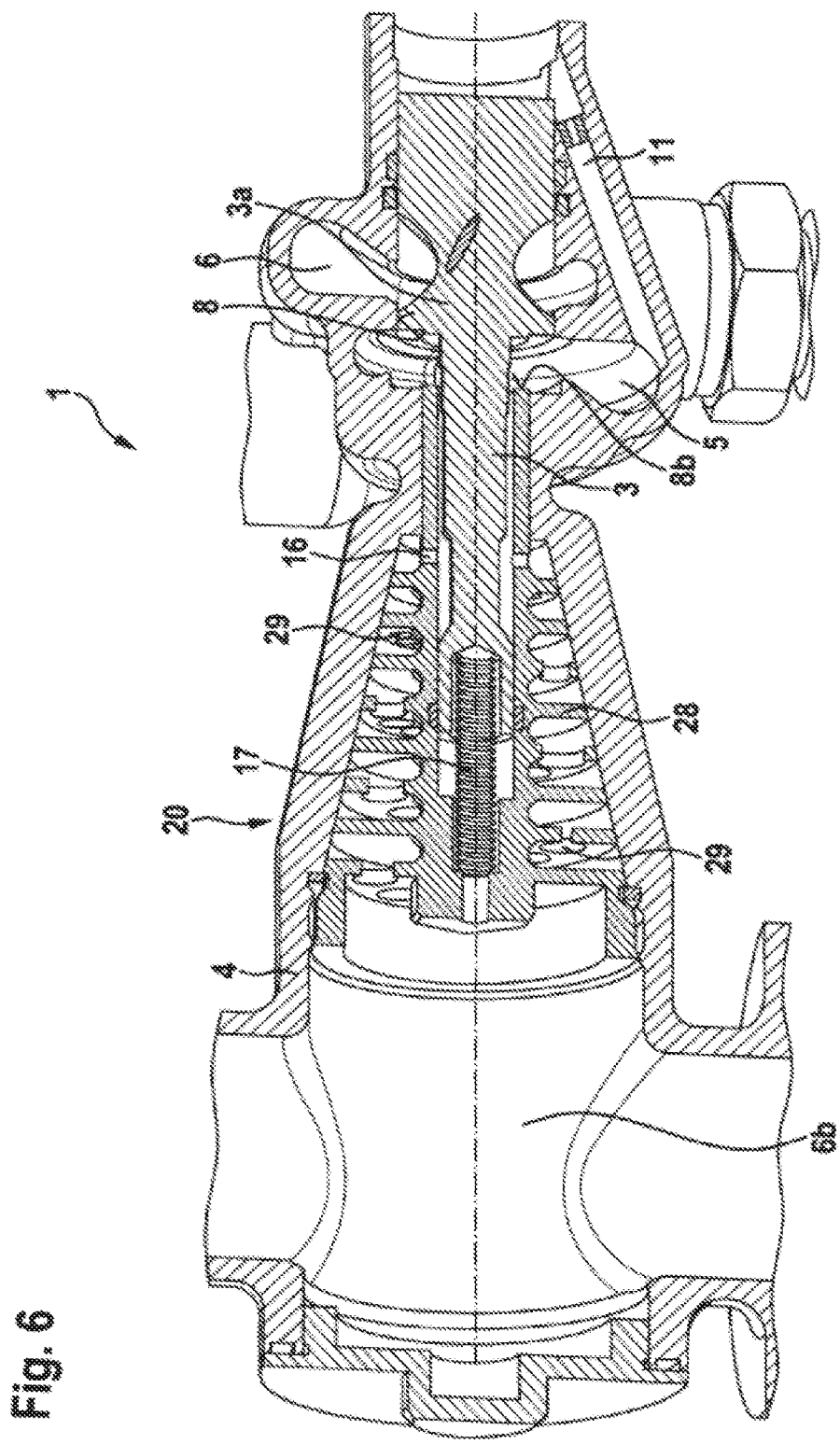
FIG. 6 shows yet another exemplary embodiment of the three-way valve in longitudinal section, wherein only the important regions are illustrated.

FIG. 6 shows a further three-way valve 1 according to the invention with the throttle 20, wherein the throttle 20 is realized as a solid cascade. The solid cascade comprises a number of cascade ribs 28 which are configured in a disk-shaped manner and are arranged coaxially with respect to the axis of the closing body 3.

The diameters of the disk-shaped cascade ribs 28 increase from the bore 16 to the second outlet channel 6b such that a cone of similar outer geometry to the solid cascade is produced. Said outer geometry is pressed or screwed into a correspondingly conically shaped inner wall of the valve housing 4. The actual throttle points of the solid cascade run through throttle bores 29 formed in the cascade ribs 28. The throttle bores 29 have increasing diameter at an increasing distance from the bore 16.

Figure 7:
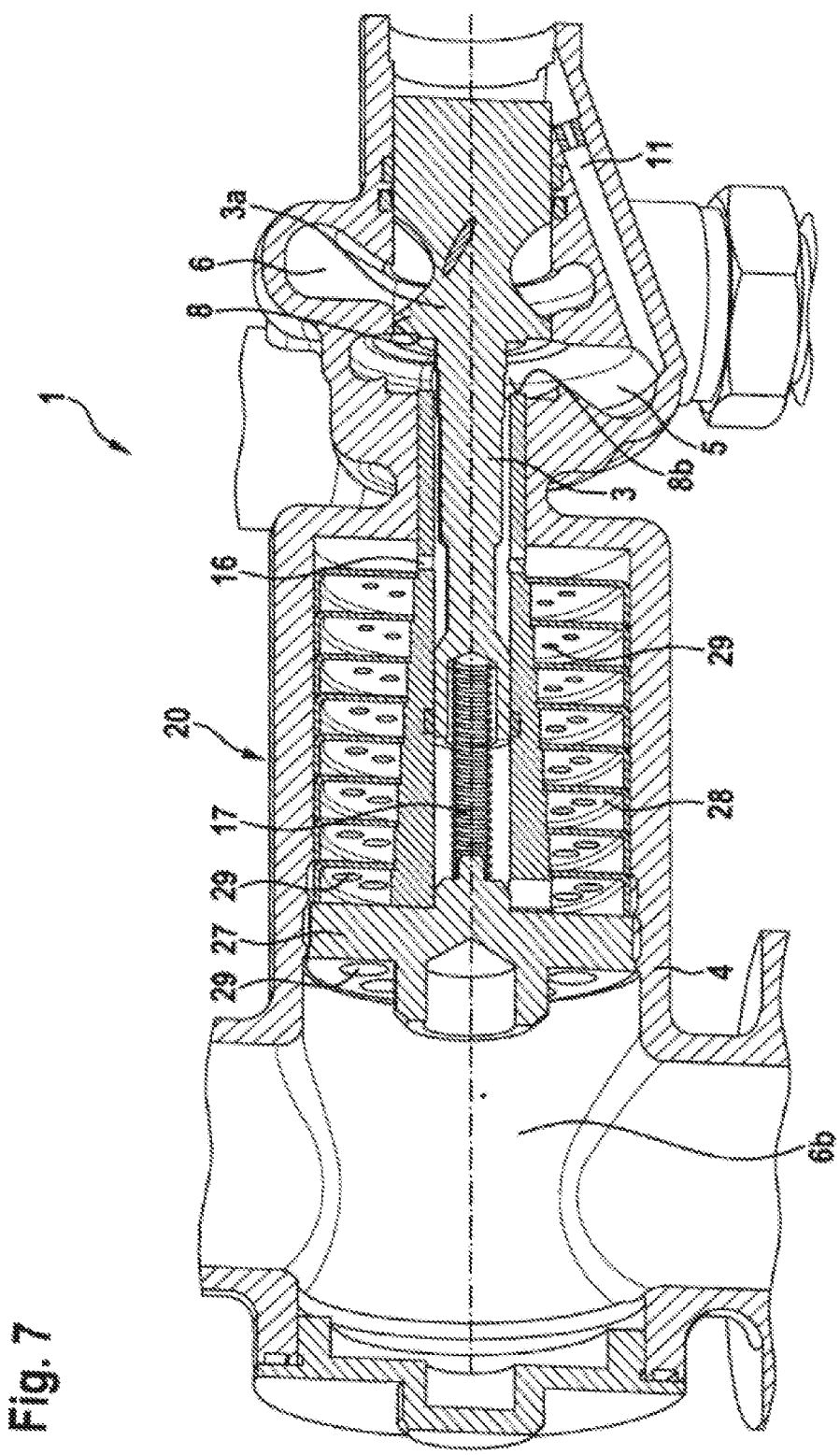
FIG. 7 shows yet another exemplary embodiment of the three-way valve in longitudinal section, wherein only the important regions are illustrated.

FIG. 7 shows an exemplary embodiment of the three-way valve 1 that is similar to FIG. 6. However, in this embodiment, the throttle 20 is not realized as a solid cascade, but rather as a sheet-metal cascade. The sheet-metal cascade has a number of cup-shaped cascade ribs 28 which are arranged one above another or in series and are clamped in the valve housing 4 by the flange 27. The throttle bores 29 are formed in the cascade ribs 28 and in the flange 27 and have diameters which become larger toward the second outlet channel 6b. Of course, as an alternative thereto, the numbers of the throttle bores 29 per cascade rib 28 may also be increased at a decreasing distance from the second outlet channel 6b, wherein the individual throttle bores 29 can then have the same diameters.

The manner of operation of the three-way valve 1 according to the invention is as follows: When the first hydraulic connection is open, i.e. from the inlet channel 5 to the first outlet channel 6, the fluid flows unthrottled through the three-way valve 1. The first outlet channel 6 preferably opens into a consumer to which the first outlet pressure $p_6$ is intended to be made available. The inlet pressure $p_5$ is then preferably intended to be identical to the first outlet pressure $p_6$. An example of such a consumer is the expansion machine 104 of the waste-heat recovery system 100, as shown in FIG. 3.

The consumer, for example the expansion machine 104, expands the fluid to a lower pressure, for example to $\sim p_{6b}$; the first decrease of pressure arises at the consumer. The outlet channel 6b is preferably connected to the output of the consumer or of the expansion machine 104, and therefore the three-way valve 1 is used as a bypass valve to the consumer. The second hydraulic connection is then designed as a bypass line to the consumer.

The three-way valve 1 is constructed according to the invention in such a manner that, when the second hydraulic connection is open, the throttle 20 throttles the fluid to the same pressure—i.e. because of the second decrease of pressure—as the consumer when the first hydraulic connection is open, namely to the second outlet pressure $p_{6b}$. As a result, no negative influences of the valve position on the inlet pressure $p_5$ arise. This means that the position of the closing body 3 does not have any influence on the inlet pressure $p_5$. In the waste-heat recovery system 100 of FIG. 3, the inlet pressure $p_5$ corresponds to an outlet pressure of the evaporator 3 that is dependent in turn on an outlet pressure of the pump 102. By means of the three-way valve 1 according to the invention, the inlet pressure $p_5$ is independent of the position of the closing body 3. As a result, a mass flow through the pump 102—or a rotational speed of the pump 102—can be controlled independently of the valve position of the three-way valve 1 or of the bypass valve. Furthermore, pump 102 and evaporator 103 are thus not loaded with harmful pressure peaks when the valve position is switched over.

The invention claimed is:

1. A three-way valve (1) with a valve housing (4) and a closing body (3) arranged in a longitudinally movable manner in the valve housing (4), wherein an inlet channel (5), a first outlet channel (6) and a second outlet channel (6b) are formed in the valve housing (4), wherein the closing body (3) interacts by longitudinal movement with a first valve seat (8) formed in the valve housing (4) and thereby opens and closes a first hydraulic connection between the inlet channel (5) and the first outlet channel (6), and wherein the closing body (3) interacts by longitudinal movement with a second valve seat (8b) formed in the valve housing (4) and thereby opens and closes a second hydraulic connection between the inlet channel (5) and the second outlet channel (6b), characterized in that a throttle (20) is formed in the second hydraulic connection, characterized in that the throttle (20) comprises a throttle box, and characterized in that the throttle box has a first ribbed cylinder (25) and a second ribbed cylinder (26), wherein the two ribbed cylinders (25, 26) each have a cylinder part wall (25d, 26d) and ribs (25b, 26b) arranged thereon.

2. The three-way valve (1) according to claim 1, characterized in that the two ribbed cylinders (25, 26) intermesh and therefore the throttle (20) is formed between the cylinder part wall (25d, 26d) of the one ribbed cylinder (25, 26) and the ribs (25b, 26b) of the other ribbed cylinder (25, 26) in each case.

3. The three-way valve (1) according to claim 1, characterized in that the throttle (20) is designed over its length as a diffuser.

4. A waste-heat recovery system (100) comprising a circuit (100a) conducting a working medium, wherein the circuit (100a) comprises a pump (102), an evaporator (103), a bypass valve (1), an expansion machine (104) and a condenser (105) in a direction of flow of the working medium, wherein a bypass line (106) is arranged parallel to the expansion machine (104), and wherein the bypass valve (1) controls the mass flow of the working medium to the expansion machine (104) and to the bypass line (106), characterized in that the bypass valve (1) is a three-way valve (1) according to claim 1.

5. The waste-heat recovery system (100) according to claim 4, characterized in that the second hydraulic connection is formed in the bypass line (106).

6. The waste-heat recovery system (100) according to claim 5, characterized in that a first decrease of pressure at the expansion machine (104) when the first hydraulic connection is open is virtually a similar size as a second decrease of pressure at the throttle (20) when the second hydraulic connection is open.

7. A three-way valve (1) with a valve housing (4) and a closing body (3) arranged in a longitudinally movable manner in the valve housing (4), wherein an inlet channel (5), a first outlet channel (6) and a second outlet channel (6b) are formed in the valve housing (4), wherein the closing body (3) interacts by longitudinal movement with a first valve seat (8) formed in the valve housing (4) and thereby opens and closes a first hydraulic connection between the inlet channel (5) and the first outlet channel (6), and wherein the closing body (3) interacts by longitudinal movement with a second valve seat (8b) formed in the valve housing (4) and thereby opens and closes a second hydraulic connection between the inlet channel (5) and the second outlet channel (6b), characterized in that a throttle (20) is formed in the second hydraulic connection, and characterized in that the throttle (20) comprises a solid cascade wherein the solid cascade has cascade ribs (28) and throttle bores (29) formed therein.

8. The three-way valve (1) according to claim 7, characterized in that an outer circumference of the solid cascade has a substantially conical shape.

9. A three-way valve (1) with a valve housing (4) and a closing body (3) arranged in a longitudinally movable manner in the valve housing (4), wherein an inlet channel (5), a first outlet channel (6) and a second outlet channel (6b) are formed in the valve housing (4), wherein the closing body (3) interacts by longitudinal movement with a first valve seat (8) formed in the valve housing (4) and thereby opens and closes a first hydraulic connection between the inlet channel (5) and the first outlet channel (6), and wherein the closing body (3) interacts by longitudinal movement with a second valve seat (8b) formed in the valve housing (4) and thereby opens and closes a second hydraulic connection between the inlet channel (5) and the second outlet channel (6b), characterized in that a throttle (20) is formed in the second hydraulic connection, and characterized in that the throttle (20) comprises a sheet-metal cascade, wherein the sheet-metal cascade has cascade ribs (28) and throttle bores (29) formed therein.

10. The three-way valve (1) according to claim 9, characterized in that the cascade ribs (28) are clamped in the valve housing (4) by a flange (27).

* * * * *